United States Patent
Popovici et al.

(10) Patent No.: US 11,024,298 B2
(45) Date of Patent: *Jun. 1, 2021

(54) METHODS AND APPARATUS FOR SPEECH RECOGNITION USING A GARBAGE MODEL

(71) Applicant: Nuance Communications, Inc., Burlington, MA (US)

(72) Inventors: Cosmin Popovici, Giaveno (IT); Kenneth W. D. Smith, London (GB); Petrus C. Cools, Kerkrade (NL)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,065

(22) Filed: Jul. 18, 2019

(65) Prior Publication Data
US 2020/0143799 A1    May 7, 2020

Related U.S. Application Data

(63) Continuation of application No. 15/309,282, filed as application No. PCT/US2014/037459 on May 9, 2014, now Pat. No. 10,360,904.

(51) Int. Cl.
| | |
|---|---|
| *G10L 15/00* | (2013.01) |
| *G10L 15/20* | (2006.01) |
| *G10L 15/08* | (2006.01) |
| *G10L 15/187* | (2013.01) |
| *G10L 15/32* | (2013.01) |
| *G10L 15/02* | (2006.01) |

(52) U.S. Cl.
CPC .......... *G10L 15/187* (2013.01); *G10L 15/02* (2013.01); *G10L 15/32* (2013.01); *G10L 2015/025* (2013.01); *G10L 2015/088* (2013.01)

(58) Field of Classification Search
CPC .......... G10L 15/00; G10L 15/20; G10L 15/08
See application file for complete search history.

(56) References Cited

U.S. PATENT DOCUMENTS

| | | | |
|---|---|---|---|
| 5,797,123 A | 8/1998 | Chou et al. | |
| 5,842,165 A * | 11/1998 | Raman | G10L 15/065 704/255 |
| 6,138,095 A * | 10/2000 | Gupta | G10L 15/08 704/233 |
| 6,411,932 B1 * | 6/2002 | Molnar | G09B 19/04 704/254 |
| 7,761,296 B1 * | 7/2010 | Bakis | G10L 13/02 704/247 |

(Continued)

OTHER PUBLICATIONS

International Search Report for International Application No. PCT/US2014/037459 dated Oct. 7, 2014.

*Primary Examiner* — Shreyans A Patel
(74) *Attorney, Agent, or Firm* — Wolf, Greenfield & Sacks, P.C.

(57) ABSTRACT

Methods and apparatus for performing speech recognition using a garbage model. The method comprises receiving audio comprising speech and processing at least some of the speech using a garbage model to produce a garbage speech recognition result. The garbage model includes a plurality of sub-words, each of which corresponds to a possible combination of phonemes in a particular language.

20 Claims, 9 Drawing Sheets

(56) References Cited

U.S. PATENT DOCUMENTS

| | | | |
|---|---|---|---|
| 8,108,205 B2* | 1/2012 | Paek | G06F 40/211 |
| | | | 704/9 |
| 8,374,870 B2 | 2/2013 | Braho et al. | |
| 10,360,904 B2* | 7/2019 | Popovici | G10L 15/187 |
| 2003/0236664 A1* | 12/2003 | Sharma | G10L 15/08 |
| | | | 704/251 |
| 2005/0256712 A1 | 11/2005 | Yamada et al. | |
| 2005/0273334 A1* | 12/2005 | Schleifer | G10L 15/20 |
| | | | 704/255 |
| 2008/0177545 A1* | 7/2008 | Li | G06F 40/211 |
| | | | 704/255 |
| 2010/0217593 A1* | 8/2010 | Shields | G10L 15/144 |
| | | | 704/245 |
| 2011/0131043 A1 | 6/2011 | Adachi et al. | |
| 2013/0030803 A1* | 1/2013 | Liao | G10L 21/0208 |
| | | | 704/233 |
| 2014/0025379 A1* | 1/2014 | Ganapathiraju | G10L 15/08 |
| | | | 704/255 |
| 2017/0076718 A1 | 3/2017 | Popovici et al. | |

* cited by examiner

METHODS AND APPARATUS FOR SPEECH RECOGNITION USING A GARBAGE MODEL

RELATED APPLICATIONS

This Application claims the priority benefit under 35 U.S.C. § 120 as a continuation of U.S. application Ser. No. 15/309,282, filed Nov. 7, 2016, titled "METHODS AND APPARATUS FOR SPEECH RECOGNITION USING A GARBAGE MODEL", which is a national stage filing under 35 U.S.C. 371 of International Patent Application Serial No. PCT/US2014/037459, filed May 9, 2014, titled "METHODS AND APPARATUS FOR SPEECH RECOGNITION USING A GARBAGE MODEL". The entire contents of these applications are incorporated herein by reference in their entirety.

BACKGROUND

Some computer-based applications that accept speech as input are associated with a grammar that describes the set of words that can be recognized by a speech recognition engine that uses the grammar for speech recognition. Restricting speech recognition to a subset of all possible words in a language by using a grammar generally improves the speech recognition performance of an application. Because such closed-grammar applications are only capable of successfully recognizing words represented in the grammar, speech corresponding to a word not in the grammar may be misrecognized as one of the words in the grammar if there is no speech recognition model included in the system to process such speech. The Speech Recognition Grammar Specification (SRGS) standard specifies that a particular rule ($GARBAGE) be implemented for speech recognition applications to reduce the number of misrecognitions by out-of-grammar words.

SUMMARY

Some embodiments are directed to a method of performing speech recognition using a garbage model. The method comprises receiving audio comprising speech; and processing, by a speech recognition system including at least one processor, at least some of the speech using the garbage model to produce a garbage speech recognition result, wherein the garbage model includes a plurality of sub-words, each of which corresponds to a possible combination of phonemes in a particular language.

Some embodiments are directed to a speech recognition system, comprising: at least one input interface configured to receive audio comprising speech; a garbage model including a plurality of sub-words, each of which corresponds to a possible combination of phonemes in a particular language; and at least one processor programmed to process at least some of the speech using the garbage model to produce a garbage speech recognition result.

Some embodiments are directed to a non-transitory computer-readable medium including a plurality of instructions that, when executed by at least one processor of a speech recognition system, perform a method. The method comprises processing speech using a garbage model to produce a garbage speech recognition result, wherein the garbage model includes a plurality of sub-words, each of which corresponds to a possible combination of phonemes in a particular language.

Some embodiments are directed to a method of generating a garbage model for use with a speech recognition system. The method comprises determining based, at least in part, on a corpus of words, a set of sub-words, wherein determining the set of sub-words comprises determining combinations of phonemes included in words in the corpus; and generating, with at least one processor, the garbage model based, at least in part, on the set of sub-words.

In some embodiments, determining the set of sub-words comprises determining the set of sub-words based, at least in part, on a phonetic alphabet for a particular language, wherein the phonetic alphabet includes phoneme classes for phonemes in the particular language.

In some embodiments, the method further comprises determining, based at least in part, on at least one sub-word selection criterion, a subset of the sub-words in the set of sub-words; and wherein generating the garbage model comprises generating the sub-word garbage model based, at least in part, on the subset.

In some embodiments, the at least one sub-word selection criterion comprises sub-word length. In some embodiments, the at least one sub-word selection criterion comprises selecting the subset based on a percentage of words in the corpus used to determine the sub-words in the subset.

In some embodiments, the method further comprises evaluating a quality of the set of sub-words, wherein evaluating the quality comprises determining a percentage of words in the corpus completely covered by the sub-words in the set; and wherein generating the garbage model is performed only when the quality of the set of sub-words is greater than a threshold value.

In some embodiments, determining a percentage of words in the corpus completely covered by the sub-words in the set comprises determining that a word in the corpus is completely covered when a concatenation of a transcription of one or more sub-words in the set matches a full transcription of the word.

In some embodiments, the method further comprises updating the set of sub-words when it is determined that the quality of the set of sub-words is less than the threshold value.

In some embodiments, determining combinations of phonemes included in words in the corpus comprises receiving a character string including two vowels; determining a split point of the received character string between the two vowels based, at least in part, on statistical language information associated with the combinations of phonemes included in words in the corpus; splitting the received character string at the split point to produce two sub-words; and including in the set of sub-words, one of the two produced sub-words.

In some embodiments, the statistical language information comprises trigram probabilities based on a phoneme-class statistical language model for a particular language.

In some embodiments, determining a split point of the received character string is based, at least in part, on at least one characteristic of an n-gram present at the boundary of the character string.

In some embodiments, the at least one characteristic is selected from the group consisting of a maximum boundary n-gram level for a split point and a minimum boundary level for a split point.

In some embodiments, the character string is a word in the corpus.

In some embodiments, the character string is a portion of a word in the corpus.

In some embodiments, at least one sub-word in the set is a word in the corpus. In some embodiments, the at least one sub-word in the set that is a word in the corpus includes only one vowel or only one semi-vowel.

In some embodiments, generating the garbage model based, at least in part, on sub-words in the set of sub-words comprises creating a grammar including the set of sub-words.

In some embodiments, generating the garbage model comprises storing a lexicon including transcriptions for the sub-words in the set of sub-words.

In some embodiments, generating the garbage model comprises, for each sub-word in the set of sub-words, storing a grapheme representation of the sub-word, a phonetic transcription of the sub-word, and an occurrence probability of the sub-word in the corpus.

Some embodiments are directed to a non-transitory computer-readable storage medium encoded with a plurality of instructions that, when executed by at least one processor, perform a method comprising determining based, at least in part, on a corpus of words, a set of sub-words, wherein determining the set of sub-words comprises determining combinations of phonemes included in words in the corpus; and generating, with at least one processor, the garbage model based, at least in part, on the set of sub-words.

Some embodiments are directed to a garbage model generation system, the system comprising at least one processor programmed to determine based, at least in part, on a corpus of words, a set of sub-words, wherein determining the set of sub-words comprises determining combinations of phonemes included in words in the corpus; and generate a garbage model based, at least in part, on the set of sub-words.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
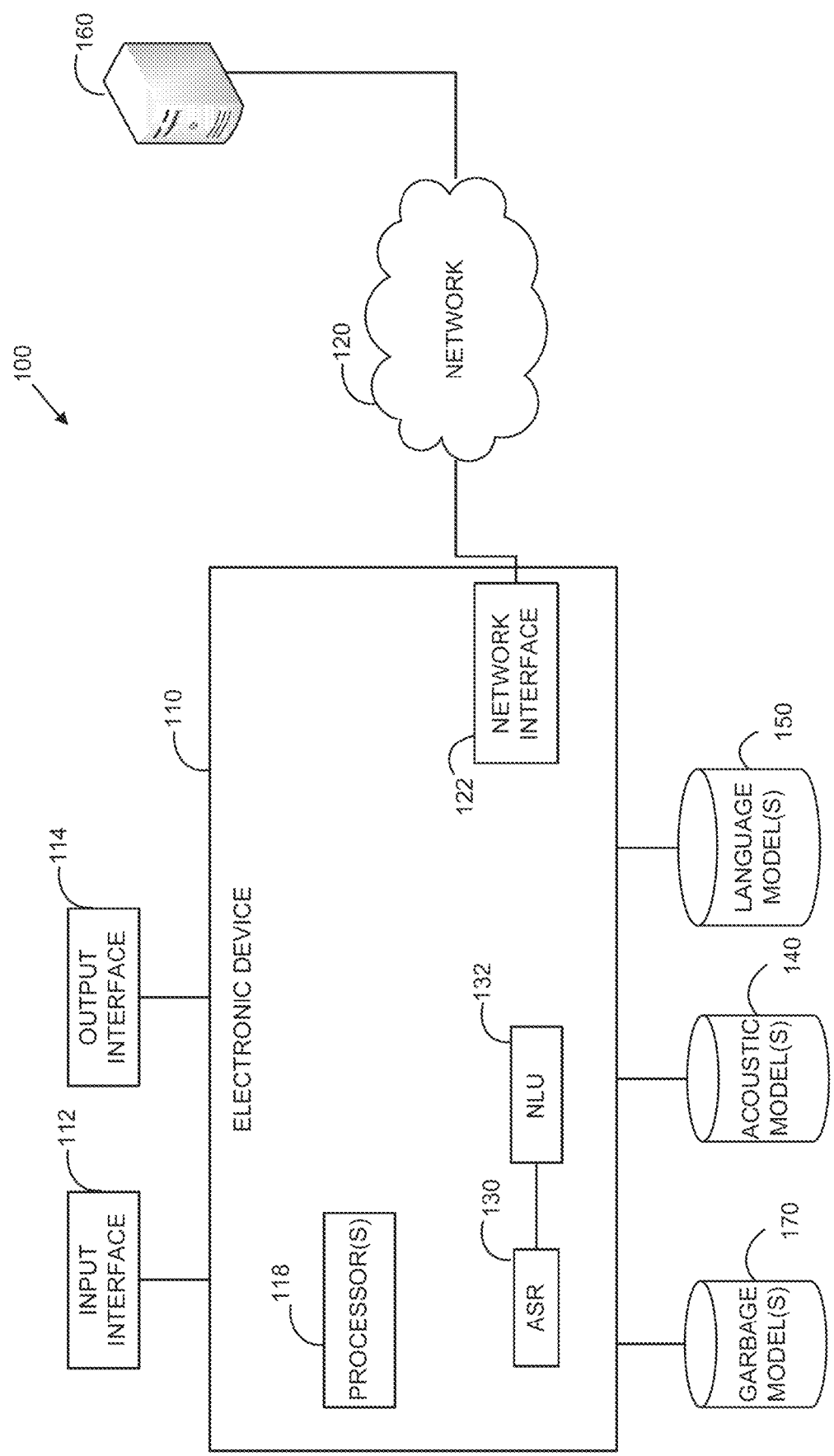
FIG. 1 is a schematic of an exemplary computing environment in which some embodiments of the invention may be implemented.

Some speech recognition systems that incorporate a garbage model to recognize speech for 'unforeseen' parts of a grammar are based on a loop of phonemes that represents all possible combinations of phonemes in a given language. Such a garbage model is capable of recognizing all phonemes in the given language in isolation, but does not consider the probabilities of different phoneme combinations occurring in sequence for the given language or acoustic information related to the transitions between phonemes, also referred to as "co-articulation." Other types of garbage models based on sub-words that include multiple phonemes (e.g., bigrams, trigrams) in a language demonstrate an improvement in terms of accuracy over garbage models based on a loop of phonemes, but at the expense of a decrease in terms of performance (e.g., overall processing speed). Such sub-word-based models are typically configured to cover all possible n-gram phoneme combinations in a language, which results in a large search space when the model is used for speech recognition. For example, a trigram-based garbage model generated for a language that includes 40 phonemes, would include a search space having 40*40*40=64,000 possible trigram combinations. This large search space often results in decreased performance (e.g., recognition speed) of a speech recognition system with which the garbage model is used.

The inventors have recognized and appreciated that conventional garbage models may be improved by taking into consideration information about how speakers of a language actually combine phonemes in speech to reduce the search space of the garbage model. Accordingly, in some embodiments of the present disclosure, information from a large corpus of transcribed speech is used to constrain the search space represented in a garbage model by eliminating phoneme combinations that are infrequently used by speakers of a particular language. Such a garbage model may demonstrate both higher accuracy due to the consideration of phoneme transitions represented by words in the corpus and improved processing efficiency by including a subset of all possible phoneme combinations for sub-words in the model.

The techniques described herein may be implemented with any application that uses speech recognition processing. In some embodiments, described below, a speech recognition system incorporating a garbage model generated using the techniques described herein may be used in connection with a speech-enabled application executing on a mobile electronic device (e.g., a virtual agent application executing on a smartphone, laptop computer, tablet computer, or other mobile electronic device). However, this is but one illustrative use for a garbage model generated using the techniques described herein, as such a garbage model may be used with any speech recognition system in any environment. For example, other environments may include, but are not limited to, a speech recognition system for use with a navigation application, a map application, a search application, and a web-based application.

In some embodiments, a speech recognition system with which a garbage model generated in accordance with the techniques describe herein may achieve a false alarm rate less than a threshold level. For example, in some embodiments, the speech recognition system, for an 80% hit rate may achieve a false alarm rate of less than 10 false alarms per hour of recorded speech, less than 5 false alarms per hour of recorded speech, less than 1 false alarm per hour of recorded speech, or less than 0.5 false alarms per hour of recorded speech.

As discussed in more detail below, a speech recognition system that incorporates a garbage model generated in accordance with some embodiments may provide further benefits over conventional speech recognition system that incorporate garbage models. Such benefits include, but are not limited to, providing a good quality language-dependent but application-independent solution for modeling unforeseen speech, while obtaining in an automatic manner a similar approach to human processing of speech into syllables. Such an approach takes into consideration speaker co-articulation information, while still maintaining acceptable results in terms of performance. As discussed in further detail below, a garbage model generated in accordance with some embodiments of the invention may be used with any speech recognition engine for any speech recognition application, as the garbage model may be implemented as a grammar that may be used alternatively to or in addition to one or more application grammars for speech recognition.

FIG. 1 shows an illustrative computing environment 100 that may be used in accordance with some embodiments. Computing environment 100 includes electronic device 110. Any suitable electronic device may be used in computing environment including, but not limited to, a mobile phone, a tablet computer, a desktop computer, a laptop computer, a television, a digital media player, a vehicle, and a home appliance.

Electronic device 110 includes input interface 112 configured to receive user input. The input interface may take any form as the aspects of the invention are not limited in this respect. In some embodiments, input interface 112 may include multiple input interfaces each configured to receive one or more types of user input. For example, input interface 112 may include a keyboard (e.g., a QWERTY keyboard), a keypad, a touch-sensitive screen, a mouse, or any other suitable user input device. As another example, input interface may include a microphone that, when activated, receives speech input and performs automatic speech recognition (ASR) either locally on the electronic device, remotely (e.g., on a server), or distributed between both. The received speech input may be stored in a datastore associated with electronic device 110 to facilitate the ASR processing.

Electronic device 110 also includes output interface 114 configured to output information from electronic device 110. The output interface may take any form as aspects of the invention are not limited in this respect. In some embodiments, output interface 114 may include multiple output interfaces each configured to provide one or more types of output. For example, output interface 114 may include one or more displays, one or more speakers, or any other suitable output device. Applications executing on electronic device 110 may be programmed to display a user interface to facilitate the performance of one or more actions associated with the application.

Electronic device 110 also includes one or more processors 118 programmed to execute a plurality of instructions to perform one or more functions on electronic device 110. Exemplary functions include, but are not limited to, facilitating the storage of user input, launching and executing one or more applications on electronic device 110, and providing output information via output interface 114. Exemplary functions also include performing speech recognition (e.g., using ASR engine 130) and performing natural language understanding (NLU) processing (e.g., using NLU system 132).

Electronic device 110 also includes network interface 122 configured to enable electronic device 110 to communicate with one or more computers via network 120. Some embodiments may be implemented using a client/server system where at least a portion of an ASR and/or an NLU process is performed remotely from electronic device 110. In such embodiments, network interface 122 may be configured to provide information to one or more server devices 160 to perform ASR, an NLU process, or some other suitable function. Network 120 may be implemented in any suitable way using any suitable communication channel(s) enabling communication between the electronic device and the one or more computers. For example, network 120 may include, but is not limited to, an Intranet or other local area network, the Internet or another wide area network, or any suitable combination of local and wide area networks. Additionally, network interface 122 may be configured to support any of the one or more types of networks that enable communication with the one or more computers.

In some embodiments, electronic device 110 is configured to process speech received via input interface 112 to produce at least one speech recognition result using an automatic speech recognition (ASR) engine 130. ASR engine 130 is configured to process audio including speech using automatic speech recognition to determine a textual representation corresponding to at least a portion of the speech. ASR engine 130 may implement any type of automatic speech recognition to process speech, as the techniques described herein are not limited by the particular automatic speech recognition process(es) used. As one non-limiting example, ASR engine 130 may employ one or more acoustic models 140 and/or language models 150 to map speech data to a textual representation. These models may be speaker independent, or one or both of the models may be associated with a particular speaker or class of speakers. Additionally, ASR engine 130 may employ one or more garbage models 170 in determining a recognition result. Illustrative techniques for generating a garbage model for use with some embodiments is discussed in more detail below. ASR engine 130 may output any suitable number of recognition results, as aspects of the invention are not limited in this respect. In some embodiments, ASR engine 130 may be configured to output N-best results determined based on an analysis of the input speech using any combination of acoustic models, language models, and garbage models, as described above.

Electronic device 110 optionally also includes NLU system 132 configured to process a textual representation to gain some understanding of the input, and output one or more NLU hypotheses based, at least in part, on the textual representation. In some embodiments, the textual representation processed by NLU system 132 may comprise one or more ASR results (e.g., the N-best results) output from an ASR engine (e.g., ASR engine 130), and the NLU system may be configured to generate one or more NLU hypotheses for each of the ASR results. It should be appreciated that NLU system 132 may process any suitable textual representation regardless of whether it was output as a result of an ASR process. For example, a textual representation entered via a keyboard, a touch screen, or received using some other input interface may alternatively (or additionally) be processed by an NLU system in accordance with the techniques described herein. Additionally, text-based results returned from a search engine or provided to electronic device 110 in some other way may also be processed by an NLU system in accordance with one or more of the techniques described herein. The NLU system and the form of its outputs may take any of numerous forms, as the techniques described herein are not limited to use with NLU systems that operate in any particular manner. Additionally, some embodiments may include a combined ASR/NLU component that receives speech as input and provides as output, an NLU classification.

The electronic device 110 shown in FIG. 1 includes both ASR and NLU functionality being performed locally on the electronic device 110. In some embodiments, some or all of these processes may be performed by one or more computers (e.g., server 160) remotely located from electronic device 110. For example, in some embodiments that include an ASR component, speech recognition may be performed locally using an embedded ASR engine associated with electronic device 110, a remote ASR in network communication with electronic device 110 via one or more networks, or speech recognition may be performed using a distributed ASR system including both embedded and remote components. In some embodiments, NLU system 132 may be located remotely from electronic device 110 and may be implemented using one or more of the same or different remote computers configured to provide remote ASR. Additionally, it should be appreciated that resources used in accordance with any one or more of ASR engine 130 and NLU engine 132 may also be located remotely from electronic device 110 to facilitate the ASR and/or NLU processes described herein, as aspects of the invention related to these processes are not limited in any way based on the particular implementation or arrangement of these components within a computing environment 100.

Figure 2:
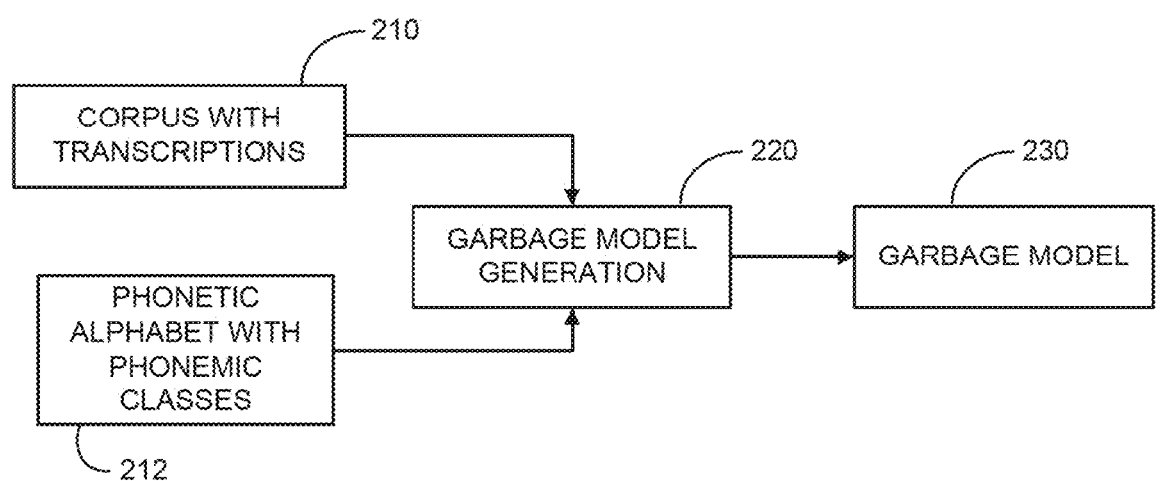
FIG. 2 is a high-level block diagram showing illustrative inputs and outputs for a garbage model generation process in accordance with some embodiments of the invention.

As discussed above, some embodiments of the invention are directed to techniques for generating a garbage model that may be used by a speech recognition engine (e.g., ASR 130) to recognize speech received by an electronic device. FIG. 2 shows an illustrative high-level block diagram of a process for generating a garbage model in accordance with some embodiments of the invention. At least one processor programmed to perform a garbage model generation process 220 may receive as input a corpus 210 of words and transcriptions associated with the words in the corpus, and a phonetic alphabet 212 describing classifications (e.g., vowels, consonants, diphthongs, etc.) for phonemes in a given language. Corpus 210 provided as input to the garbage model generation process 220 may be of any suitable size and include any suitable content, though preferably corpus 210 is large enough to ensure that the words in the corpus are representative of a wide-spectrum of usage by speakers of the given language. In some embodiments, the words in corpus 210 may be tailored for a particular domain of usage and/or knowledge. For example, corpus 210 may be tailored for use with healthcare applications, legal applications, sports applications, or any other domain-specific usage. After receiving the corpus and the phonetic alphabet as input, the garbage model is generated in act 220. Illustrative techniques for generating a garbage model in accordance with embodiments of the invention are described in more detail below.

Following generation, the garbage model for use with speech recognition applications is output in act 230. The garbage model output in act 230 may be configured in any suitable way for use by a speech recognition system. For example, in some embodiments, the garbage model is output as a grammar that may be used by the speech recognition system as an alternative to or in addition to one or more application grammars used to recognize speech for speech-enabled applications, as discussed in more detail below.

Figure 3:
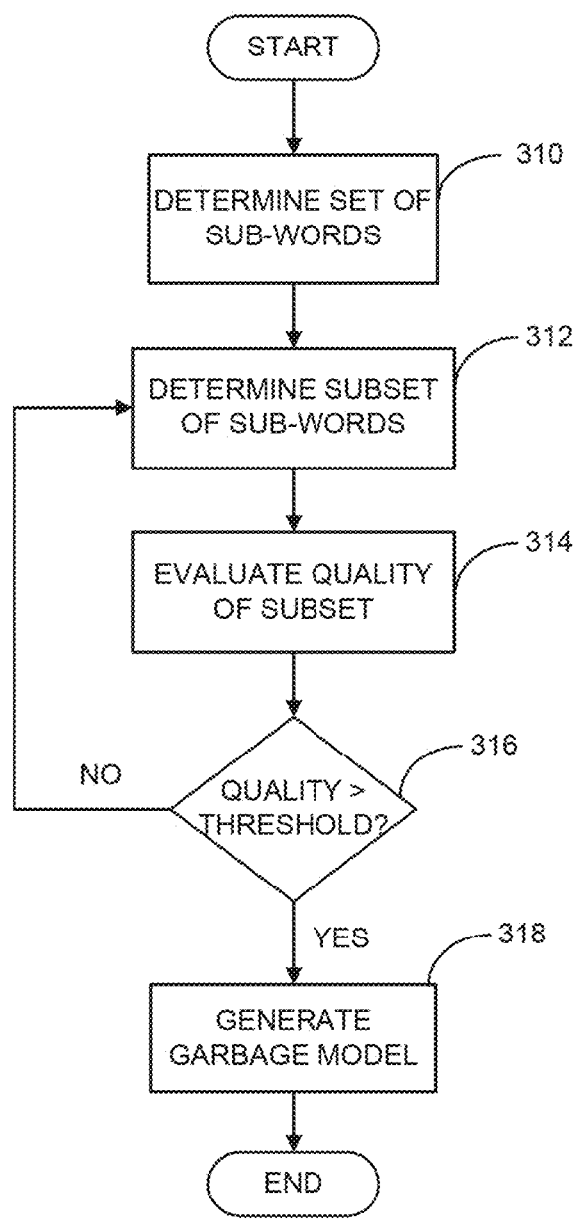
FIG. 3 is a flowchart of an illustrative process for generating a garbage model in accordance with some embodiments of the invention.

FIG. 3 shows an illustrative process for generating a garbage model in accordance with some embodiments of the invention. In act 310, a set of sub-words is determined based, at least in part, on words in a corpus provided as input to the garbage model generation process, as discussed above. As discussed in more detail below, the set of sub-words may be determined using one or more rules that govern the inclusion of sub-words into the set.

The inventors have recognized and appreciated that the set of sub-words used to generate a garbage model should preferably provide good phonetic coverage for the words in the input corpus. For example, the word 'knowledge' with transcription 'nQ1@dz' may be covered by sub-words as follows: subword 1 ('nQ')+subword 2 ('1@dZ'). In some embodiments, the quality of the set of sub-words may be evaluated and compared to a threshold value to ensure that the set of sub-words provides adequate coverage of the words in the input corpus, as discussed in more detail below. In one embodiment, the threshold value may be set to ensure 99% coverage, but embodiments of the invention are not limited and any suitable threshold value can be used. If the quality of the set of sub-words is not sufficient, the set may be updated until a set of sub-words is identified that meets an appropriate quality criterion.

As discussed above, a deficiency of some conventional n-gram based garbage models is the large search space incorporated in such models resulting from the inclusion of all (or most) possible combinations of phonemes in a language. Processing speech using a garbage model with a large search space results in a considerable amount of processing power required to process speech using the garbage model. To reduce the size of the search space, some embodiments of the present invention take into consideration the minimal length in time of each sub-word unit in the set. For example, the inventors have recognized that because some consonantal sequences (e.g., 'str,' 'kn') have a very brief duration in the speech signal, including such consonantal sequences as sub-words in the garbage model may have limited value for speech recognition, and eliminating such sequences will result in a reduction of the search space for the model. Accordingly, in some embodiments, each sub-word included in the set of sub-words is required to contain a vowel. Any other suitable criteria including, but not limited to, additional criteria discussed in more detail below, may be used to determine a set of sub-words used to generate a garbage model in accordance with other embodiments of the invention.

After generating a set of sub-words, the process of FIG. 3 proceeds to act 312, where a subset of the sub-words in the set are selected for use in generating a garbage model. In some embodiments, the entire set of sub-words determined in act 310 may be used to generate the garbage model, provided the set of sub-words has an acceptable quality, as discussed in more detail below. The inventors have recognized, however, that it may be advantageous in some implementations to generate a garbage model using only a limited (e.g., less than all) subset of sub-words determined in act 310 provided that the subset of sub-words remains of sufficiently good quality to provide adequate coverage of the words in the input corpus. Illustrative criteria for selecting a limited subset of sub-words for use in generating a garbage model are described in more detail below.

In some embodiments, one or more sub-word selection criteria are used to obtain an appropriate sub-word set, e.g., by identifying an optimal trade-off between speed (due to fewer sub-words and smaller search space) and accuracy (due to large coverage of words in the corpus). Any suitable selection criterion or criteria may be used including, but not limited to, sub-word length and a below-discussed parameter referred to herein as DB-percentage. In embodiments that employ a sub-word length selection criterion when selecting a subset of sub-words, any suitable number of characters and/or phonemes may be used for this parameter. For example, an illustrative sub-word length that may be used in some embodiments includes, but is not limited to, a length of five or six phonemes in the sub-word, and only sub-words having lengths less than this threshold may be included in the subset.

As described herein, DB-percentage is a measure that establishes how much of an input corpus is used to determine the entire sub-word set. The DB-percentage parameter is a "generality" measurement of a garbage model that would be generated using a set of sub-words. If a small DB-percentage (e.g., 30%-50%) covers a large percentage (e.g., 99%) of all of the words in the input corpus, the obtained sub-word set may be considered robust. Any suitable selection criterion based on DB-percentage may be used, and a DB-percentage value of 30%-50% is provided merely for illustration.

After determining the subset of sub-words, the process proceeds to act 314, where the quality of the subset is evaluated. As discussed above, when all possible combinations of phonemes in a language are used to generate a garbage model it can be ensured that the garbage model will be capable of processing any speech input for that language. However, such garbage models result in a large search space that consumes substantial processing resources. Accordingly, it is desirable to reduce this search space by selectively reducing the number of sub-words in the garbage model, while preferably still being able to cover substantially all (e.g., at least 99% or some other threshold) of the words in the input corpus. Accordingly, in act 314, the quality of the subset of sub-words is determined.

An illustrative technique for evaluating the quality of a set of sub-words is the coverage percentage process. During a first step of the coverage percentage process (e.g., act 312 in FIG. 3), all sub-words from a selected subset are applied in an attempt to cover the phonetic transcription of all words in the input corpus. During a second step (e.g., act 314 in FIG. 3), the percentage of all words that are completely covered by the sub-words in the subset is determined. In some embodiments that implement the coverage percentage process, a word in the input corpus is considered completely covered if a concatenation of the transcription of one or more sub-words in the subset is equal to the phonetic transcription of the word in the corpus. If there is no sub-word sequence that can be obtained from the sub-words in the set which completely matches the transcription of the word in the input corpus, the word may be considered not covered by the subset.

As discussed above, any suitable coverage percentage may be used, and embodiments of the invention are not limited based on a selection of this parameter. The comparison of the quality of the selected subset to a threshold value (e.g., 99%) is illustrated as act 316 in FIG. 3. Although a threshold value for quality of a subset of 99% coverage is described herein, it should be appreciated that any suitable threshold value may alternatively be used. For example, in some embodiments, a threshold value may be 90%, 95%, 98%, 99.5%, 99.9% coverage, or any other suitable threshold.

If it is determined that the quality of the subset is not greater than the threshold value, the process returns to act 312, where a different subset of sub-words is selected in an effort to improve the quality of the subset. For example, the previously-selected subset of sub-words may be updated by adding additional sub-words to the subset. Alternatively, a new subset of sub-words may be selected in any other suitable manner. Acts 312-316 are repeated until it is determined in act 316 that the quality of the subset is greater than the threshold value, after which the process proceeds to act 318, where the garbage model is generated using the subset of sub-words having an acceptable quality.

The garbage model may be generated in any suitable way including, but not limited to, generating a garbage model grammar that includes each of the sub-words in the determined subset. In some embodiments, each of the sub-words in the subset is associated in the grammar with a graphemic representation (i.e., the character string, which identifies the sub-word), a phonetic transcription, and an occurrence probability (e.g., unigram probability) of the sub-word in the input corpus. It should be appreciated that other information for each sub-word may additionally or alternatively be stored in the garbage model grammar, as embodiments of the invention are not limited in this respect.

In some embodiments, the garbage model grammar may be implemented as a grxml-grammar, which includes a lexicon containing all phonetic transcriptions for the sub-words in the grammar. In some implementations, all graphemic representations and corresponding occurrence probabilities may be grouped in a single alternative (e.g., 'one-of' element) within the grxml-grammar, as discussed in more detail below.

Figure 4:
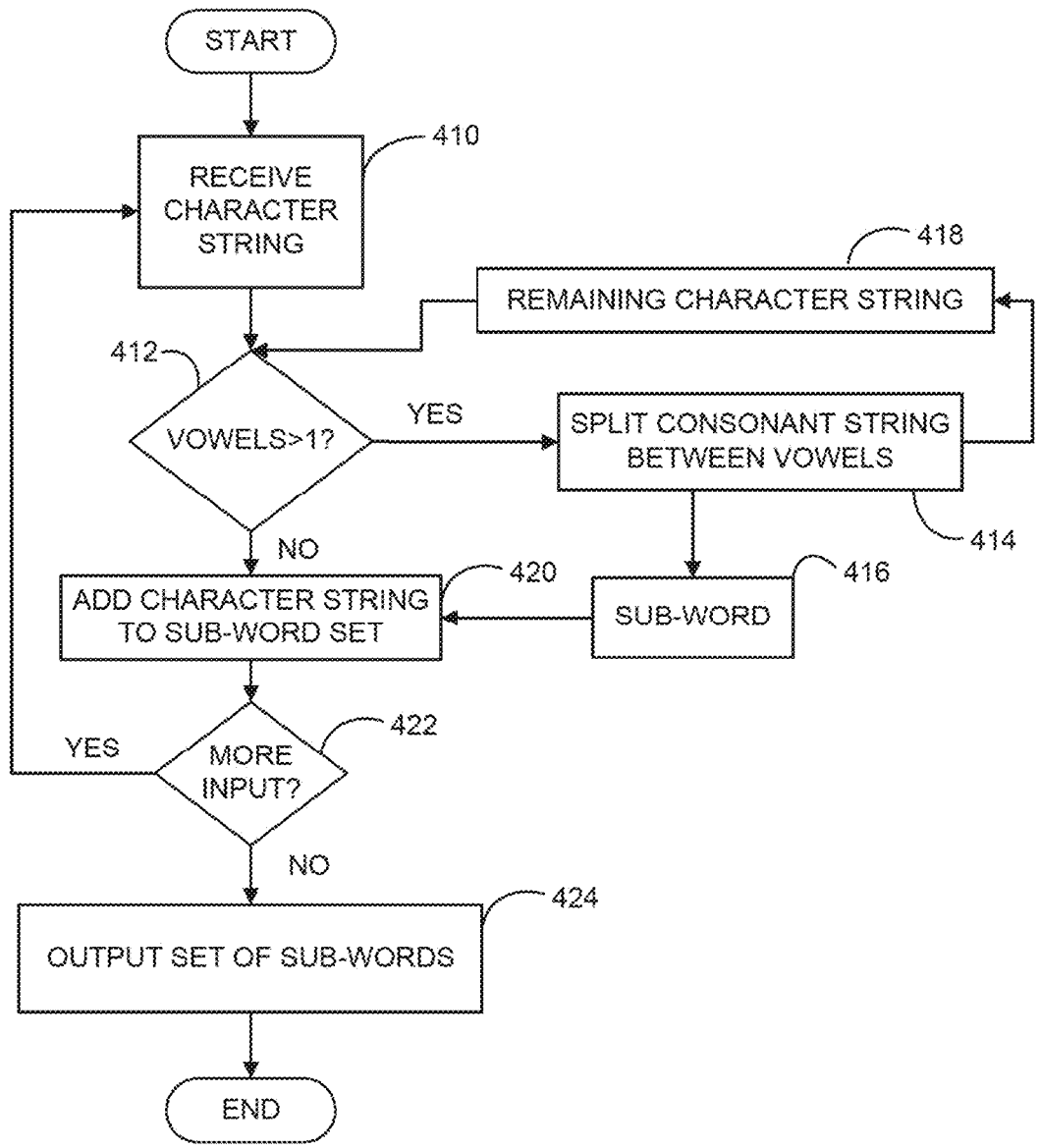
FIG. 4 is a flowchart of an illustrative process for determining a set of sub-words used to generate a garbage model in accordance with some embodiments of the invention.

FIG. 4 shows an illustrative process for determining a set of sub-words based, at least in part, on a corpus of words received as input, in accordance with some embodiments. In act 410, a character string corresponding to all or a portion of a word in the corpus is received. As described above, some embodiments impose a constraint that all sub-words in the set include a single vowel. Although the example described in FIG. 4 uses a single criterion (i.e., whether a transcription for a character string includes more than one vowel), it should be appreciated that any other selection criterion or criteria may additionally or alternatively be use when determining whether to split a character string, and embodiments of the invention are not limited in this respect. For example, in some embodiments, a constraint may be imposed that sub-words contain a number of phonemes less than or equal to a threshold value. In this example, transcriptions for character strings that do not meet this criteria may be split using one or more of the techniques described in more detail below.

After receiving a character string (and its associated transcription) the process proceeds to act 412, where it is determined whether the received character string includes a vowel. This determination may be made in any suitable way. For example, as described above in connection with FIG. 2, each of the words in the corpus may be associated with a phonetic transcription, and the phonetic transcription may be used, at least in part, to determine whether a character string includes a vowel. As also described above in connection with FIG. 2, in some embodiments, a phonetic alphabet including classifications for phonemes in a particular language may also be input to the garbage model generation process. Some embodiments may use both the phonetic transcription associated with a character string and the classification information from the phonetic alphabet to determine whether a character sting includes a vowel.

In some embodiments, a phoneme that corresponds to a diphthong, although consisting of multiple vowels, may nonetheless be considered to be a single vowel when determining whether to split a character string in act 412. Additionally, if an input character string corresponding to a word in the corpus contains only a single vowel, the character string for the word may be added to the set of sub-words in its entirety. Accordingly, in some embodiments, at least one sub-word in the set of sub-words may correspond to a word from the input corpus that has not been split using one or more of the techniques for splitting character strings, as discussed in more detail below.

Some words in the input corpus may include phonemes classified as semivowels (also known as 'glides') such as 'w' or 'j.' Semivowels are phonetically similar to vowels, but function as syllable boundaries rather than a nucleus of syllable. In some embodiments, semivowels may be treated in the same manner as vowels when determining, in act 412, whether to split a character string that includes a semivowel. For example, if an input character string only includes a single semivowel, the entire character string may be added to the set of sub-words. It should be appreciated that semivowels may not be treated as the equivalents of a vowel for all aspects of the techniques described herein. For example, semivowels may be considered consonants for processes that perform actions other than determining whether to split a character string.

Continuing with the illustrative example above for the word 'knowledge' from the input corpus, the character string 'knowledge' is associated with the phonetic transcription 'nQl@dz.' The input phonetic alphabet may specify that the phonemes 'Q' and '@' correspond to vowels. Accordingly, it may be determined in act 412 that the character string 'knowledge,' based on an analysis of its phonetic transcription, includes more than one vowel (i.e., it includes two vowels). In this example, because the character string includes more than one vowel, the process proceeds to act 414 where the character string is split between the two vowels. Illustrative techniques describing exemplary criteria for splitting a character string in accordance with some embodiments are described in more detail below with regard to FIGS. 5 and 6.

As shown in FIG. 4, the output of the splitting process is a sub-word 416, which may be subsequently added to the set of sub-words in act 420, and a remaining character string 418 that includes the remainder portion of the character string following the split point. The remaining character string 418 may be provided as input to act 412, where it is determined whether to perform further splitting of the remaining character string 418 (e.g., if the remaining character string 418 includes multiple vowels, or using any other suitable splitting criterion or criteria). If it is determined in act 412 that the remaining character string does not include more than one vowel, the process proceeds to act 420, where the remaining character string is added as a sub-word to the sub-word set.

The process then proceeds to act 422, where it is determined whether there is additional input to process or whether the set of sub-words is complete. This determination may be made in any suitable way, and embodiments of the invention are not limited in this respect. In some embodiments, all of the words in the input corpus may be processed to determine the set of sub-words. In other embodiments, less than all of the words in the input corpus may be processed to identify sub-words to include in the set. For example, the process shown in FIG. 3 may be an iterative process, where additional words from the corpus continue to be processed until it is determined that the quality of the sub-word set achieves a level of quality that is greater than a threshold value, as discussed above in connection with FIG. 3. It should be appreciated, however, that any suitable criteria may be alternatively or additionally used in act 422 to determine whether to process additional input. When it is determined in act 422 that there is no additional input to process, the process proceeds to act 424, where the set of sub-words is output.

Figure 5:
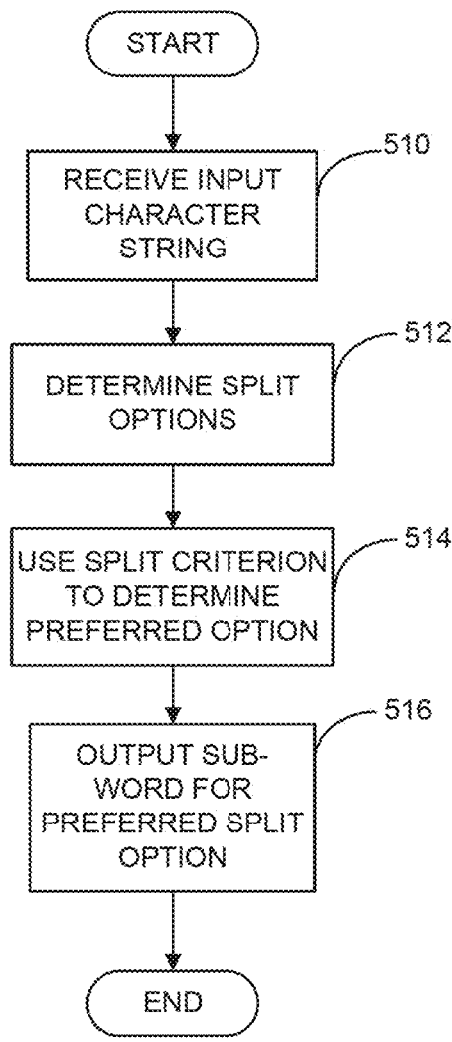
FIG. 5 is a flowchart of an illustrative process for splitting a transcription of a character string in accordance with some embodiments of the invention.

FIG. 5 shows an illustrative process for splitting a character sting (e.g., a transcription of a word or a portion of a word in an input corpus) in accordance with some embodiments of the invention. In act 510, a character string is received. For example, when it is determined in act 412 of FIG. 4 that a character string should be split, the character string is provided as input to a splitting algorithm that determines an appropriate division point within a consonantal sequence between two vowels in the character string to obtain a sub-word. In some embodiments, the division point is determined based, at least in part, on statistical language model (SLM) information associated with words in the corpus. For example, in one implementation, the division point may be determined using trigram probabilities based on a phonetic-class SLM, as described in more detail below.

After it is determined that a split of a character string is to occur, the process of FIG. 5 proceeds to act 512, where the options for possible division point to split the character string are determined. Returning to the illustrative example of the character string 'knowledge' having a transcription of 'nQl@dz,' and the vowel phonemes 'Q' and '@,' there are two split options for the consonantal string 'l' depending on whether the division point is placed before or after the phoneme 'l' For example, the two possibilities are as follows:

'nQl'+'@dz' (first split option) or
'nQ'+'l@dz' (second split option)

After the split options are identified, the process proceeds to act 514, where one or more split criteria are used to determine which of the split options is the preferred or "best" option. Any suitable criterion or criteria may be used to determine which split option is preferred. Illustrative techniques for determining a preferred split option are discussed in more detail below. After determining a preferred split option, the process proceeds to act 516, where a sub-word determined based on the preferred split option is output. The output sub-word may be added to the sub-word set, as discussed above.

As discussed above, in some embodiments, the probabilities given by a trigram phonetic-class SLM may be used to select a preferred split option. In comparison to a canonical class-based SLM, words in a phonetic-class SLM are substituted by phonemes. In some embodiments, the phoneme classes in the SLM are defined by the phoneme classes (e.g., fricatives, plosives, nasals, etc.) described in the phonetic alphabet provided as input to the garbage model generation process, as discussed above.

Prior to its use in facilitating the selection of a preferred split point, a phonetic-class SLM used in accordance with some embodiments of the invention may be trained using all or a portion of the information in the input corpus. In embodiments that use a subset of the corpus to train the phonetic-class SLM, the subset may be selected in any suitable way. For example, in some embodiments that subset of the corpus used to train the SLM may be the same subset of the corpus on which the split criterion is applied to determine the set of sub-words, as discussed above. However, it should be appreciated that other subsets of the corpus may alternatively be used to train the SLM, and embodiments of the invention are not limited in this respect.

After training the SLM, the SLM is applied to the subset of the corpus, as discussed in more detail below. In some embodiments, the SLM is applied without smoothing (as done for canonical SLMs). For example, smoothing may not be used if the SLM training corpus and the corpus used to compute the sub-words is the same (or larger) to ensure that there are no unseen events. In the illustrative example below, the SLM is applied to force a split in a given point in the consonantal sequence between two vowels and to compute the "probabilistic difference" from the un-split sequence. This value is then compared with probabilistic difference values for one or more other possible split points to determine which split point is the preferred one.

For example, consider the example discussed above for the phoneme sequence 'nQl@dz,' which has two possible split points, before or after the phoneme '1.'

The probability of the up-split transcription is:

$$P(n|\langle s\rangle)*P(Q|\langle s\rangle,n)*P(l|n,Q)*P(@|Q,l)* \\ P(dZ|l,@)*P(\langle/s\rangle|@,dZ).$$

The probability of the first split (before the '1') is:

$$P(n|\langle s\rangle)*P(Q|\langle s\rangle,n)*P(\langle/s\rangle|n,Q)*P(l|\langle s\rangle)* \\ P(@|\langle s\rangle,l)*P(dZ|l,@)*P(\langle/s\rangle|@,dZ)$$

The probability of the second split (after the '1') is:

$$P(n|\langle s\rangle)*P(Q|\langle s\rangle,n)*P(l|n,Q)*P(\langle/s\rangle|Q,l)* \\ P(@|\langle s\rangle)*P(dZ|\langle s\rangle,@)*P(\langle/s\rangle|@,dZ)$$

The probabilities introduced by the split procedure are indicated above in boldface. Accordingly, the comparison between the two split options is as follows:

$$\frac{P(\langle/s\rangle|n,Q)*P(l|\langle s\rangle)*P(@|\langle s\rangle,l)}{P(l|n,Q)*P(@|Q,l)} \sim \\ \frac{P(\langle/s\rangle|Q,l)*P(@|\langle s\rangle)*P(dZ|\langle s\rangle,@)}{P(@|Q,l)*P(dZ|l,@)},$$

where each probability is computed as follows:

$$P(z|x,y) = \frac{C(x,y,z)}{C(x,y)}; P(z|y) = \frac{C(y,z)}{C(y)}; P(z) = \frac{C(z)}{C_{TOTAL}},$$

where C(x,y,z) is the number of occurrences of the phonetic sequence (x,y,z) in the training corpus, C(y,z) is the number of occurrences of the phonetic sequence (y,z) in the training corpus, C(z) is the number of occurrences of the phoneme 'z,' in the training corpus, and $C_{TOTAL}$ represents the total amount of phonemes in the training corpus.

N-grams containing begin-end markers (i.e., <s> and </s>) are referred to herein as boundary n-grams. Each boundary n-gram may be defined by a position and a level. For example, P(</s|n, Q) is a boundary n-gram with position 'end' and level '3' (i.e., it is a trigram), whereas P(l|⟨s⟩) has position 'begin' and level '2.' Some boundary n-grams introduced by a split may not be represented in the trained SLM. For example, consider the phonetic sequence 'a b c d e f' in a training corpus. The following trigrams will be found in training corpus: '<s> a b,' 'a b c,' 'b c d,' 'c d e,' 'd e f,' 'e f </s>.' However, if a split is forced between phonemes 'c' and 'd', two new trigrams will result: 'b c </s>' and '<s> d e,' which may or may not be found in the training corpus depending on whether transcriptions in the corpus for sequences other than 'a b c d e f' include these trigrams at the beginning or end of the transcription (i.e., for the two new trigrams to exist in the training corpus, another transcription in the corpus must start with the trigram '<s> d e' and another transcription in the corpus must end with the trigram 'b c </s>').

As discussed above, in some embodiments, the SLM probabilities are obtained without smoothing. To account for the existence of boundary n-grams that may be created during the splitting process, in some embodiments, a back-off technique is introduced to emphasize the fact that n-grams already present at the word boundaries are likely a suitable boundary for sub-words.

Figure 6:
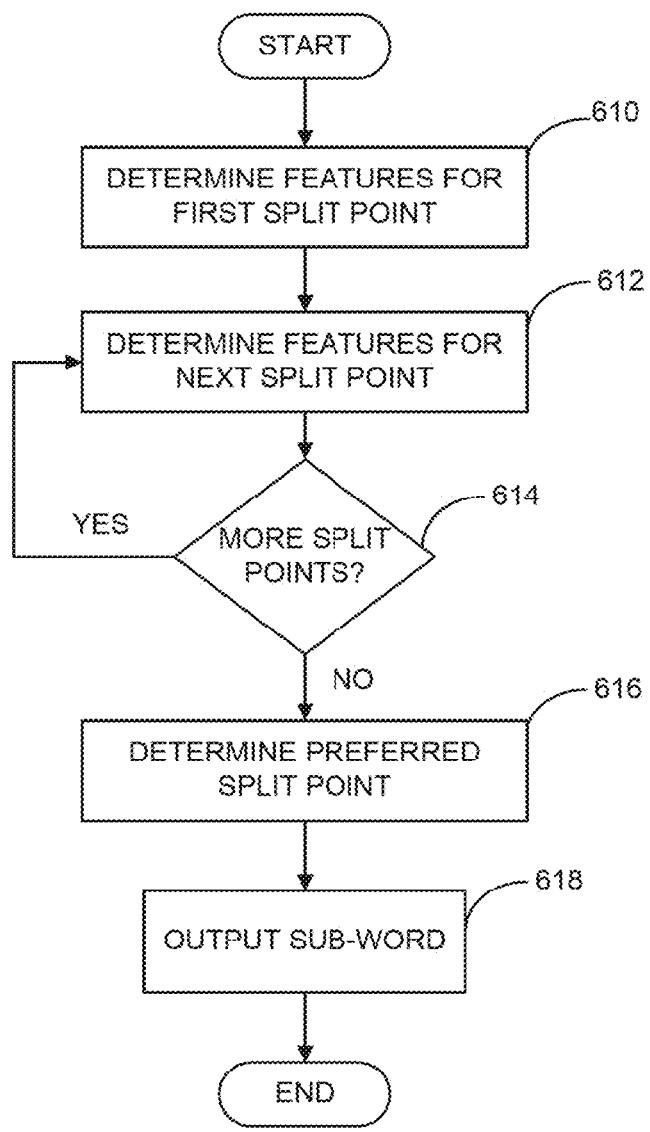
FIG. 6 is a flowchart of an illustrative backing-off process for considering boundary n-grams when splitting a transcription of a character string in accordance with some embodiments of the invention.

FIG. 6 shows an illustrative back-off process that may be used to facilitate a determination of where to split a transcription of a character string in accordance with some embodiments. In act 610, one or more features for a first split point option are determined. In some embodiments, the following features may be determined for each split point option, though it should be appreciated that any other suitable features may additionally or alternatively be used:

max_lev: the maximum boundary n-gram level for the given split point min_lev: the minimum boundary n-gram level for the given split point value: the value derived from the "statistical difference" between the split and un-split transcriptions, used for the comparison, as discussed above.

In the example above, considering only the split point before the '1' phoneme,

SP['1']. max_lev=3 (i.e., both boundary trigrams exist)

SP['1']. min_lev=3 (i.e., at least one boundary trigram exists)

$$SP['1'].value = \frac{P(\langle/s\rangle|n,Q)*P(l|\langle s\rangle)*P(@|\langle s\rangle,l)}{P(l|n,Q)*P(@|Q,l)}$$

After the feature(s) for the first split point have been determined, the process proceeds to act 612, where the feature(s) for the next split point are determined. The process then proceeds to act 614, where it is determined whether additional split points exist. If it is determined that additional split points exist, the process returns to act 612, where the feature(s) for the next split point are determined. Alternatively, if it is determined in act 614 that feature(s) for all split points have been determined, the process proceeds to act 616, where the feature(s) for the split points are compared to determine a preferred split point from among the split point options. In some embodiments, rather than determining feature(s) for all possible split points prior to comparing the feature(s) between split points, a running comparison between feature(s) for a current split point may be compared with feature(s) for a previous split point (e.g., a previous preferred or "best" split point). That is, in some embodiments, act 614 may occur after act 616 rather than prior to act 616 as illustrated in FIG. 6, and embodiments are not limited based on the order in which these and other acts of FIG. 6 are performed.

A comparison of the feature(s) determined for multiple split points may be made in any suitable way. For example, in some embodiments, after all features of a split point, SP[x], are computed, this split point can be compared with another split point SP[y] using the following back-off technique (choose SP[x] means: best split point is before the phoneme 'x'):

choose SP[y]
if (SP[x].max_lev>SP[y].max_lev) then choose SP[x]
else if (SP[x].max_lev==SP[y].max__lev and SP[x].min_lev>SP[y].min_lev) then choose SP[x]
else if (SP[x].max_lev==SP[y].max__lev and SP[x].min__lev==SP[y].min__lev and SP[x].value>SP[y].value)
then choose SP[x].

Once all split points are processed and the preferred split point is determined, the process proceeds to act 618, where the phonetic sequence between the current identified preferred split point and previously-identified preferred split point is output as a new sub-word. If the current preferred split point is the first identified split point, the new sub-word may be delimited by the current split point and the start of the current phonetic transcription. When the end of a transcription is reached, a new sub-word is created and output, and the corresponding phonetic sequence is determined from the latest determined preferred split point until the end of the transcription.

For example, consider a transcription consisting of the phoneme sequence 'a b c d e f g h i j k,' where the phonemes 'b,' 'e,' and 'h' are classified as vowels (e.g., based on the input phonetic alphabet) and the remaining phonemes are classified as various types of consonants (e.g., fricatives, plosives, etc.). In accordance with some embodiments, a first split point should occur between the vowel sequence 'b c d e.' Using the splitting criterion described herein (or other suitable splitting criteria), a preferred split point in this sequence is determined. For example, it may be determined that the preferred split point is between the phonemes 'c' and 'd' resulting in the output of a sub-word consisting of the phonemes 'a b c.' The remaining portion of the transcription (i.e., 'd e f g h i j k') is further processed to identify a split point between the vowels 'e' and 'h.' Using the splitting criterion described herein (or other suitable splitting criteria), a preferred split point in this sequence may be determined to be between the phonemes 'f' and 'g' resulting in the output of a sub-word consisting of the phonemes 'd e f.' Because the remaining portion of the transcription (i.e., 'g h i j k') only contains a single vowel (i.e., the phoneme 'h'), a sub-word consisting of the phonemes 'g h i j k' is output, and another transcription may be processed. In this example, three sub-words for the input transcription were created and output, though it should be appreciated that any suitable number of sub-words may be created and output, and embodiments of the present invention are not limited in this respect. Additionally, although the criterion used to identify a portion of a phonetic transcription that should be split is based only on whether transcription includes more than one vowel, any other criterion or criteria may additionally, or alternatively be used, as discussed above in connection with act 412 of FIG. 4

In a more general case, a given split point may be analyzed considering all boundary n-grams types. For example, given a phonetic sequence:

$$\ldots, h_{j-3}, h_{j-2}, c_{j-1}, c_j, h_{j+1}, h_{j+2}, h_{j+3}, \ldots,$$

where $c_{j-1}$ and $c_j$ are consonants, consider the split points before $c_j$.

The probability of the un-split transcription is as follows:

$$\ldots * P(c_{j-1}|h_{j-3}, h_{j-2}) * P(c_j|h_{j-2}, c_{j-1}) * P(h_{j+1}|c_{j-1}, c_j) * P(h_{j+2}|c_j, h_{j+1}) * \ldots$$

If both boundary trigrams exist, the probability for the split transcription before $c_j$ is provided as equation (1) as follows:

$$\ldots * P(c_{j-1}|h_{j-3}, h_{j-2}) * P(\langle/s\rangle|h_{j-2}, c_{j-1}) * P(c_j|\langle s\rangle) * P(h_{j+1}|\langle s\rangle, c_j) * P(h_{j+2}|c_j, h_{j+1}) * \ldots$$

Accordingly, the features for this split point are defined as:
SP[$c_j$]. max_lev=3
SP[$c_j$]. min_lev=3

$$SP[c_j].\text{value} = \frac{P(\langle/s\rangle | h_{j-2}, c_{j-1}) * P(c_j | \langle s\rangle) * P(h_{j+1} | \langle s\rangle, c_j)}{P(c_j | h_{j-2}, c_{j-1}) * P(h_{j+1} | c_{j-1}, c_j)}$$

As discussed in more detail below, the value feature for the split points changes depending on the availability of the boundary n-grams. In this example, each back-off value is considered 1.0, so it can be omitted from the multiplicative expressions shown above. Provided below is a discussion of various changes to equation (1) that may occur based on the availability of a certain boundary n-grams.

Availability of end boundary n-grams:
if $(h_{j-2}, c_{j-1}, \langle/s\rangle)$ exists, no changes of probability $P(\langle/s\rangle | h_{j-2}, c_{j-1})$ in equation (1) are needed
else if $(c_{j-1}, \langle/s\rangle)$ exists, $P(\langle/s\rangle | h_{j-2}, c_{j-1})$ in equation (1) becomes $P(\langle/s\rangle | c_{j-1})$
else $P(\langle/s\rangle | h_{j-2}, c_{j-1})$ in equation (1) becomes $P(\langle/s\rangle)$ Availability of begin boundary n-grams:
if $(\langle s\rangle, c_j, h_{j+1})$ exists, both $P(c_j | \langle s\rangle)$ and $P(h_{j+1} | \langle s\rangle, c_j)$ in equation (1) remain unchanged
else if $(\langle s\rangle, c_j)$ exists, $P(h_{j+1} | \langle s\rangle, c_j)$ in equation (1) becomes $P(h_{j+1} | c_j)$
else $P(h_{j+1} | \langle s\rangle, c_j)$ in equation (1) becomes $P(h_{j+1} | c_j)$ and $P(c_j | \langle s\rangle)$ becomes $P(c_j)$.

The following method may be applied to determine the features for the split point before $c_j$:
1. Set the initial values of the split points
   SP[$c_j$]. max_lev=3
   SP[$c_j$]. min_lev=3

$$SP[c_j].\text{value} = \frac{1}{P(c_j | h_{j-2}, c_{j-1}) * P(h_{j+1} | c_{j-1}, c_j)}$$

2. Process the end boundary n-grams:
if $(h_{j-2}, c_{j-1}, \langle s\rangle)$ exists:
   a. SP[$c_j$]. max_lev=3
   b. Update SP[$c_j$].value: SP[$c_j$].value*=$P(\langle/s\rangle | h_{j-2}, c_{j-1})$
else if $(c_{j-1}, \langle/s\rangle)$ exists:
   a. SP[$c_j$]. max_lev=2
   b. Update SP[$c_j$].value: SP[$c_j$].value*=$P(\langle/s\rangle | c_{j-1})$
else:
   a. SP[$c_j$]. max_lev=1
   b. Update SP[$c_j$].value: SP[$c_j$].value*=$P(\langle/s\rangle)$
3. Process the begin boundary n-grams
   SP[$c_j$]. min_lev=SP[$c_j$]. max_lev
if $(\langle s\rangle), c_j, h_{j+1})$ exists:
   1. SP[$c_j$]. max_lev=3
   2. Update SP[$c_j$].value:
      SP[$c_j$].value*=$P(c_j | \langle s\rangle) * P(h_{j+1} | \langle s\rangle, c_j)$
else if $(\langle s\rangle, c_j)$ exists:
   1. if (SP[$c_j$]. min_lev>2)
      SP[$c_j$]. min_lev=2
   2. if (SP[$c_j$]. max__lev<2)
      SP[$c_j$]. max_lev=2
   3. Update SP[$c_j$].value: SP[$c_j$].value*=$P(c_j | \langle s\rangle) * P(h_{j+1} | c_j)$ else
1. if (SP[$c_j$]. min_lev>1)
   SP[$c_j$]. min_lev=1
2. Update SP[$c_j$].value: SP [$c_j$].value*=P($c_j$)*P($h_{j+1}|c_j$)

Figure 7:
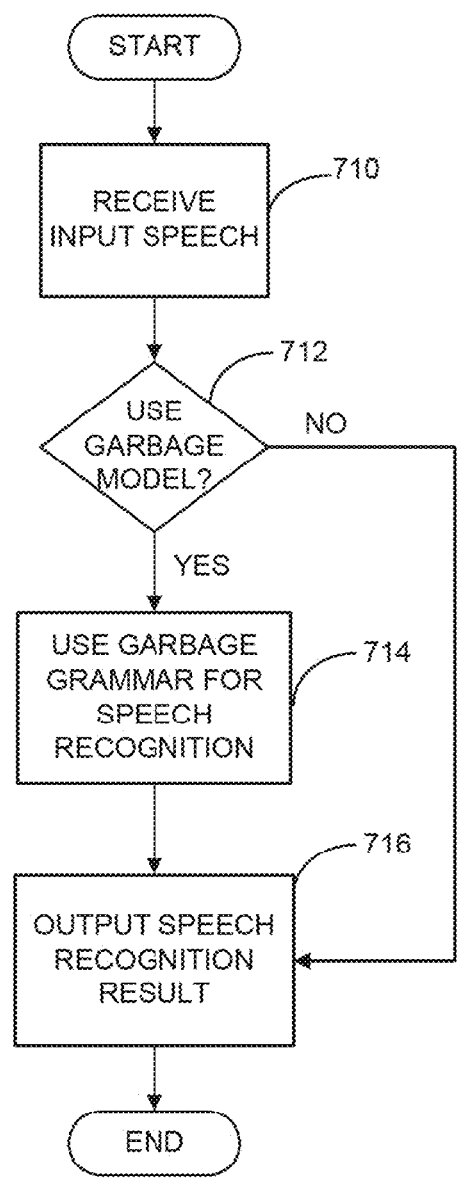
FIG. 7 is a flowchart of an illustrative process for selectively using a garbage model in a speech recognition application in accordance with some embodiments of the invention.

Garbage models generated in accordance with embodiments of the invention may be used in any suitable speech recognition application including, but not limited to the exemplary use cases described below for keyword spotting, begin/end of utterance processing, and transcription verification. FIG. 7 shows an illustrative implementation where a decision to use a garbage model grammar is based on one or more selection criterion. As discussed in more detail below in connection with FIG. 8, in an alternative implementation, the garbage model grammar may be used to recognize input speech in parallel with one or more grammars other than the garbage model grammar.

The process shown in FIG. 7 begins in act 710, where input speech is received for processing. The process then proceeds to act 712, where it is determined whether to use the garbage model for processing at least some of the input speech. The determination of whether to use the garbage model may be based on any suitable criterion or criteria and embodiments of the invention are not limited in this respect. In some embodiments, at least some of the input speech may first be processed using one more grammars (e.g., a system grammar, an application grammar, etc.) other than the garbage model grammar, and it may be determined in act 712 to use the garbage model to process all or a portion of the input speech when it is determined that a confidence value associated with a speech recognition result based on processing with the other one or more grammars is below a threshold value. For example, if processing with an application grammar provides a speech recognition output having a confidence value below 25%, it may be determined in act 712 to process the speech input using the garbage model grammar. It should be appreciated that any suitable threshold for determining whether to process the input speech using the garbage model may be used, and a confidence level threshold of 25% is provided merely for illustrative purposes.

When it is determined in act 712 to process at least some of the input speech using the garbage model grammar, the process proceeds to act 714, where the garbage model grammar is used to process the at least some of the input speech. The process then proceeds to act 716, where the speech recognition result provided by processing at least some of the input speech using the garbage model grammar is output. Alternatively, if it is determined in act 712 that at least some of the input speech should not be processed using the garbage model grammar (e.g., if the confidence value associated with a speech recognition result obtained using an application grammar is above a threshold value (e.g., 90%)), the at least some of the input speech is not processed using the garbage model grammar and the speech recognition result obtained by processing with one or more other grammars is output. By selectively processing speech input using a garbage model based on a determination criterion, less processing resources may be used than implementations where the garbage model grammar is always employed to recognize at least some of the input speech.

Figure 8:
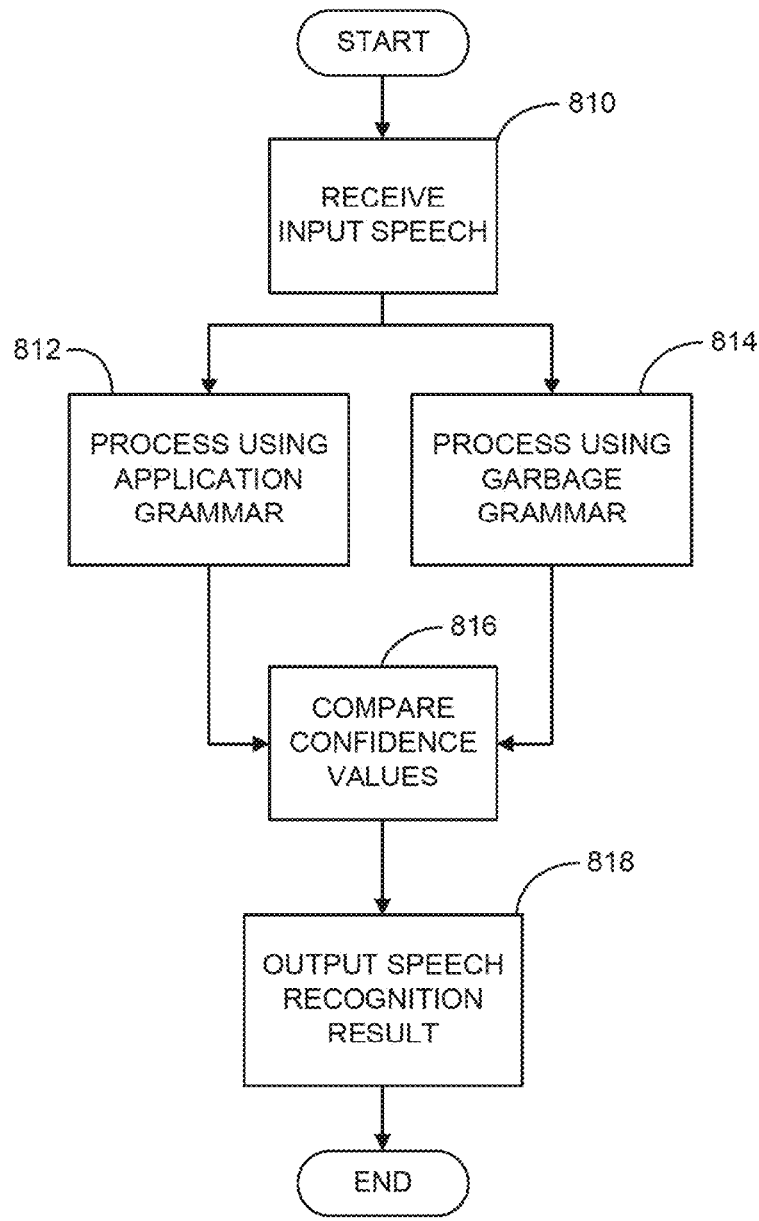
FIG. 8 is a flowchart of an illustrative process for using a garbage model in a speech recognition application in accordance with some embodiments of the invention.

FIG. 8 shows an alternate illustrative process for using a garbage model generated in accordance with embodiments of the invention in a speech recognition system. In act 810, input speech is received for processing. Rather than serially processing at least some of the input speech first by an application (or other suitable) grammar followed by selectively processing the at least some of the input speech using the garbage model grammar, as discussed above in connection with FIG. 7, in the illustrative process of FIG. 8, at least some of the input speech is processed by both an application grammar and the garbage model grammar in parallel as shown in acts 812 and 814 of FIG. 8.

The process then proceeds to act 816 where the outputs of processing by the application grammar(s) and the garbage model grammar are compared to determine which speech recognition result to output. The outputs may be compared in any suitable way, and embodiments of the invention are not limited in this respect. For example, as shown in FIG. 8, in some embodiments, confidence values associated with speech recognition result outputs from processing with the application grammar(s) and processing with the garbage model grammar may be compared, and a suitable criterion may be applied to determine which speech recognition result to output. In some embodiments, the speech recognition result with the higher confidence value may be determined to be output, and the process proceeds to act 818, where the speech recognition result is output.

It should be appreciated that the speech recognition result may be output in any suitable way. For example, in some embodiments, when it is determined that the speech recognition result corresponding to processing with the garbage model grammar should be output, the at least some input speech that was processed may merely be marked in any suitable way as "garbage" and discarded rather than actually outputting any particular speech recognition result. In some embodiments, speech marked as "garbage" may be recorded in a log file, or stored in any other suitable way to enable an administrator or other user to determine which speech has been marked as "garbage."

Illustrative use cases for several applications, are now described. The first use case is for use in a keyword spotting application, where it is desirable to detect particular keywords using a keyword spotting grammar. The keywords, when detected, may be used to trigger any action including, but not limited to, unlocking a smartphone or other mobile electronic device using biometrics. In an illustrative use case, a garbage model generated in accordance with some embodiments may be used with an application that employs a keyword spotting grammar using the following structure:

```
<?xml version="1.0" encoding="UTF-8"?>
<grammar version="1.0"
        xmlns="http://www.w3.org/2001/06/grammar"
        xml:lang="en-us" root="main" tag-format="semantics/1.0">
    <meta name="swirec_normalize_to_probabilities"
    content="0" />
    <rule id="keywords">
        <one-of>
        <item>keyword_1</item>
        <item>keyword_2</item>
        ...
        </one-of>
    </rule>
<rule id="main">
    <item repeat="1-" repeat-prob="0.95">
        <one-of>
            <item weight="0.25">
                <ruleref uri="garbage_en-us_noLoop-
                .gram"
                type="x-swi-grammar"/>
            </item>
            <item weight="0.75">
                <ruleref uri="#keywords"/>
            </item>
        </one-of>
```

-continued

```
        </item>
    </rule>
</grammar>
```

As shown above, in this example, the reference to the garbage model grammar, indicated in boldface, is placed in alternative (e.g., in parallel) to the keyword grammar and both grammars are surrounded by an external loop, which ensures the continuity of the keyword-spotting process.

Another illustrative use case is to use the garbage model grammar generated in accordance with some embodiments of the invention to cover unforeseen speech at the start and/or at the end of a given utterance modeled by an application grammar (mainGrammar), using the following structure:

```
<grammar version="1.0"
    xmlns="http://www.w3.org/2001/06/grammar"
    xml:lang="en-us" root="main" tag-format="semantics/1.0">
    <meta name="swirec__normalize__to__probabilities" content="0" />
    <rule id="mainGrammar">
        ...
    </rule>
    <rule id="main">
        <item repeat="0-" repeat-prob="0.05">
            <ruleref uri="garbage_en-us__noLoop.gram"
                type="x-swi-grammar"/>
        </item>
        <ruleref uri="# mainGrammar "/>
        <item repeat="0-" repeat-prob="0.05">
            <ruleref uri="garbage_en-us__noLoop.gram"
                type="x-swi-grammar"/>
        </item>
    </rule>
</grammar>
```

Any suitable application grammar (mainGrammar) may be used including, but not limited to a date grammar, a time grammar, and a names list grammar. The reference to the garbage model grammar generated in accordance with one or more of the techniques described above is indicated in boldface. As shown, the garbage model grammar is used to process speech at the beginning and at the end of an utterance.

Yet another use case for a garbage model grammar generated in accordance with some embodiments of the invention is testing of a given transcription set. For example, speech may be automatically transcribed using an automatic speech recognition system, and the same speech may be processed using the garbage model grammar to uncover words that may have been improperly transcribed using the automatic speech recognition engine. In one implementation, a confidence value associated with a transcription processed using the ASR engine may be compared to a confidence value associated with a transcription generated using the garbage model grammar, and the comparison may be used to identify one or more possible incorrect transcriptions in the transcription set and/or to detect transcriptions of words that should be left out of the transcription set.

Although only three use cases have been described, it should be appreciated that a garbage model grammar generated in accordance with some embodiments of the invention may be used in any speech recognition application for which rejecting speech not included in an application grammar is desirable.

Figure 9:
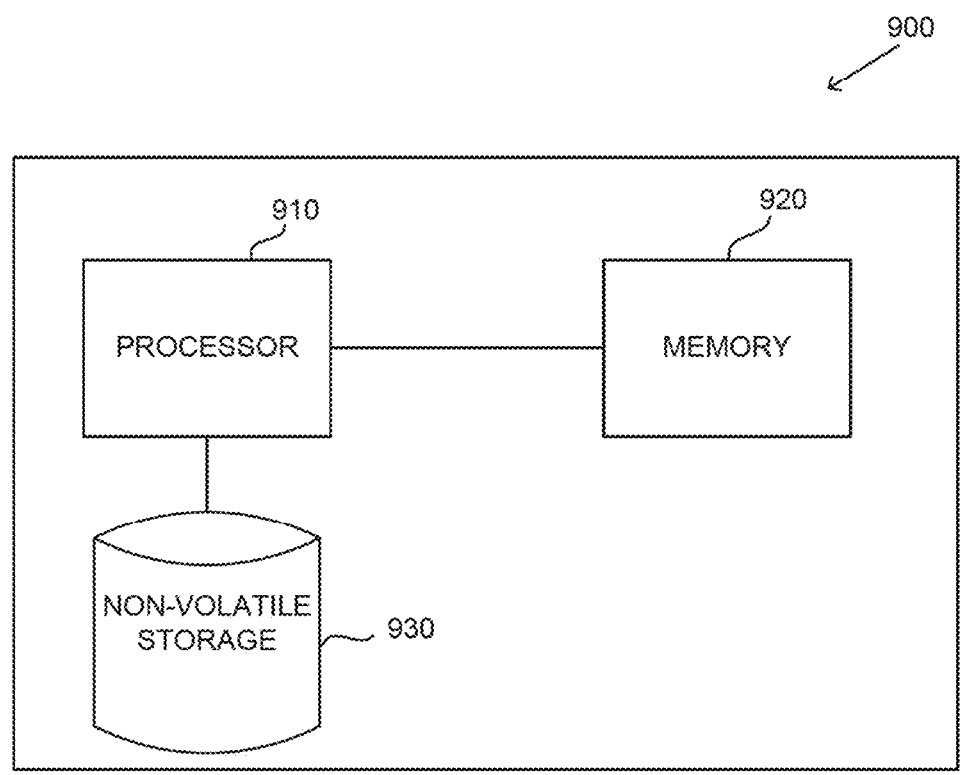
FIG. 9 is an exemplary computer system that may be used to implement some embodiments of the invention.

An illustrative implementation of a computer system 900 that may be used in connection with any of the embodiments of the invention described herein is shown in FIG. 9. The computer system 900 may include one or more processors 910 and one or more computer-readable non-transitory storage media (e.g., memory 920 and one or more non-volatile storage media 930). The processor 910 may control writing data to and reading data from the memory 920 and the non-volatile storage device 930 in any suitable manner, as the aspects of the present invention described herein are not limited in this respect. To perform any of the functionality described herein, the processor 910 may execute one or more instructions stored in one or more computer-readable storage media (e.g., the memory 920), which may serve as non-transitory computer-readable storage media storing instructions for execution by the processor 910.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a USB drive, a flash memory, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of performing speech recognition using a garbage model, the method comprising:
   receiving audio comprising speech; and
   processing, by a speech recognition system including at least one processor, at least some of the speech using the garbage model to produce a garbage speech recognition result, wherein the garbage model includes a plurality of sub-words, each of which corresponds to a possible combination of phonemes in a particular language.

2. The method of claim 1, further comprising:
   determining whether to process the at least some of the speech using the garbage model; and
   processing the at least some of the speech using the garbage model when it is determined to process the at least some of the speech using the garbage model.

3. The method of claim 2, further comprising:
   recognizing the speech using a first speech recognition model to produce a first speech recognition result having an associated confidence value, wherein the first speech recognition model is different than the garbage model; and
   wherein determining whether to process the at least some of the speech using the garbage model comprises determining to process the at least some of the speech using the garbage model when the confidence value is less than a threshold value.

4. The method of claim 3, wherein the first speech recognition model comprises an application grammar.

5. The method of claim 3, wherein the first speech recognition model comprises a keyword spotting grammar.

6. The method of claim 2, wherein the speech comprises a beginning portion, a middle portion, and an end portion, and wherein determining whether to process the at least some of the speech using the garbage model comprises determining to recognize the beginning portion and/or the end portion of the speech using the garbage model.

7. The method of claim 1, wherein the garbage speech recognition result is associated with a first confidence value, the method further comprising:
   processing the at least some of the speech using a first speech recognition model to produce a first speech recognition result having a second confidence value, wherein the first speech recognition model is different than the garbage model; and
   identifying the at least some of the speech as garbage when the first confidence value is greater than the second confidence value.

8. The method of claim 1, wherein the method further comprises:
   receiving a first transcription associated with the speech;
   processing the speech using the garbage model to produce a second transcription; and
   determining that the first transcription is incorrect based, at least in part, on a comparison of the first transcription and the second transcription.

9. The method of claim 1, wherein the speech recognition system, for an 80% hit rate achieves a false alarm rate of less than 10 false alarms per hour of received audio.

10. The method of claim 1, wherein the speech recognition system, for an 80% hit rate achieves a false alarm rate of less than 5 false alarms per hour of received audio.

11. The method of claim 1, wherein the speech recognition system, for an 80% hit rate achieves a false alarm rate of less than 1 false alarm per hour of received audio.

12. The method of claim 1, wherein the speech recognition system, for an 80% hit rate achieves a false alarm rate of less than 0.5 false alarms per hour of received audio.

13. The method of claim 1, wherein at least one sub-word in the plurality of sub-words in the garbage model is a word.

14. The method of claim 13, wherein the at least one sub-word that is a word includes only one vowel or only one semi-vowel.

15. The method of claim 1, wherein processing at least some of the speech using the garbage model to produce a garbage speech recognition result comprises processing the at least some of the speech using a grammar including the plurality of sub-words in the garbage model.

16. The method of claim 1, wherein processing at least some of the speech using the garbage model to produce a garbage speech recognition result comprises processing the at least some of the speech using a lexicon including transcriptions for the plurality of sub-words in the garbage model.

17. A speech recognition system, comprising:
   at least one input interface configured to receive audio comprising speech;
   a garbage model including a plurality of sub-words, each of which corresponds to a possible combination of phonemes in a particular language; and
   at least one processor programmed to process at least some of the speech using the garbage model to produce a garbage speech recognition result.

18. The speech recognition system of claim 17, further comprising a first speech recognition model different than the garbage model, wherein the garbage speech recognition result is associated with a first confidence value, and wherein the at least one processor is further programmed to:
   process the at least some of the speech using the first speech recognition model to produce a first speech recognition result having a second confidence value; and
   identify the at least some of the speech as garbage when the first confidence value is greater than the second confidence value.

19. The speech recognition system of claim 17, wherein the at least one interface is further configured to receive a first transcription associated with the speech; and wherein the at least one processor is further programmed to:
   process the speech using the garbage model to produce a second transcription; and determine that the first transcription is incorrect based, at least in part, on a comparison of the first transcription and the second transcription.

20. A non-transitory computer-readable medium including a plurality of instructions that, when executed by at least one processor of a speech recognition system, perform a method comprising:

processing speech using a garbage model to produce a garbage speech recognition result, wherein the garbage model includes a plurality of sub-words, each of which corresponds to a possible combination of phonemes in a particular language.

\* \* \* \* \*